US005218543A

United States Patent [19]

Komatsu

[11] Patent Number: 5,218,543

[45] Date of Patent: Jun. 8, 1993

[54] DIGITAL MOVEMENT RECORDING APPARATUS WITH REDUCED MEMORY CONSUMPTION

[75] Inventor: Toshio Komatsu, Shimada, Japan

[73] Assignee: Yazaki Corporation, Tokyo, Japan

[21] Appl. No.: 665,117

[22] Filed: Mar. 6, 1991

[30] Foreign Application Priority Data

Mar. 7, 1990 [JP] Japan .................................... 2-53552

[51] Int. Cl.$^5$ ............................................ G06F 13/00

[52] U.S. Cl. ............................ 364/424.04; 364/925.3; 360/5; 368/8

[58] Field of Search .................. 364/424.04, 406, 920, 364/925, 925.1, 925.3, 222.4, 424.01, 442; 368/8; 346/33 MC; 360/5, 6

[56] References Cited

U.S. PATENT DOCUMENTS

| | | | |
|---|---|---|---|
| 4,258,421 | 3/1981 | Juhasz et al. | 364/424.04 |
| 4,685,061 | 8/1987 | Whitaker | 364/424.04 |
| 4,853,856 | 8/1989 | Honway | 364/424.04 X |
| 4,853,859 | 8/1989 | Morita et al. | 364/424.04 |
| 4,939,652 | 7/1990 | Steiner | 364/424.04 |
| 5,046,007 | 9/1991 | McCrery et al. | 364/424.04 |

*Primary Examiner*—Parshotam S. Lall

*Assistant Examiner*—Thomas S. Auchterlonie

*Attorney, Agent, or Firm*—Nikaido, Marmelstein, Murray & Oram

[57] ABSTRACT

A digital movement data recording apparatus which controls reduction of an available portion of a record medium, particularly of an ID record area of a record medium, to increase the period of time over which movement data can be recorded. The apparatus comprises time counting means for starting counting of a time in response to ending of a movement of the vehicle, judging means for judging, in response to starting of a movement of the vehicle, whether or not the counted time remains within a predetermined range, and erasing means for erasing, when the counted time remains within the predetermined range, last time data recorded in a movement data record area of the record medium and representative of an ending time of a movement of the vehicle and address data recorded in the ID record area of the record medium and representative of the address of the movement data record area of the record medium at which the last time data are recorded. Accordingly, even if ending of a movement is detected by a large number of times in a short period of time, data regarding such movements are not maintained in the record medium.

10 Claims, 8 Drawing Sheets

DIGITAL MOVEMENT RECORDING APPARATUS WITH REDUCED MEMORY CONSUMPTION

BACKGROUND OF THE INVENTION

1. Field of the Invention

This invention relates to a digital movement recording apparatus which is carried by a vehicle and records movement data representative of a moving condition of the vehicle as digital data.

2. Description of the Prior Art

Digital movement recording apparatus are conventionally known which employ, as a record medium, a memory card adapted to be removably inserted into a recording section of a vehicle. In such memory card, movement data including a speed, a travel distance and so forth for each movement are recorded in a specific format. Such specific format is illustratively shown in FIG. 7. Referring to FIG. 7, a conventional memory card of such specific format has a first record area (movement data record area) 2*a* and a second record area (ID record area) 2*b*. In the first record area 2*a*, movement data $UD_1$ to $UD_n$ representative of particulars of movements of a vehicle are recorded together with time data $STD_1$ to $STD_n$ and $ETD_1$ to $ETD_n$ representative of starting and ending times of such movements. Meanwhile, in the second record area 2*b*, address data $AD_1$ to $AD_n$ representative of addresses of the first record area 2*a* at which the ending time data $ETD_1$ to $ETD_n$ are recorded, respectively, are recorded.

Since such digital movement recording apparatus records movement data for each movement of the vehicle as described above, it includes means for detecting starting and ending of a movement of the vehicle. Such starting and ending of a movement of the vehicle are normally detected either by detecting switching on and off, respectively, of an ignition switch or an accessory switch or by detecting insertion of a memory card into a recording section to prepare for recording and removal of the memory card from the recording section to disable recording, respectively. Thus, if it is detected that the ignition switch is switched on or a memory card is inserted into the recording section, then it is determined that a movement of the vehicle is started and the time then is written into the first record area 2*a* of the memory card as starting time data ST representative a starting time of the movement. Subsequently to such recording of the starting time, movement data UD including a speed during the movement and distance data are successively written into the first record area 2*a* of the memory card. After then, if it is detected that the ignition switch is switched off or the memory card is removed from the recording section, it is determined that the movement comes to an end and the time then is written as ending time data ETD representative of an ending time of the movement into the first record area 2*a* of the memory card subsequent to the movement data UD. Then, ending address data AD representative of an address of the first record area 2*a* of the memory card at which the ending time data ETD are recorded are written into the second or ID record area 2*b* of the memory card. Thus, with such ending address data AD, the movement data from the starting time to the ending time can be recognized as movement data during the movement of the vehicle.

While a memory card has, in addition to a movement data record area, an ID record area for recording ending address data therein in order to allow a movement of a vehicle from a starting time to an ending time to be recognized as movement data of a movement as described above, such ID record area is limited in storage capacity. Accordingly, if the ignition switch or accessory switch is switched on and off by a great number of times or if a memory card serving as a record medium is inserted and removed by a great number of times, then all of the storage capacity of the ID record area may be used up. In this instance, while the movement data record area still remain empty sufficiently and can record data therein, movement data each including a starting time, a speed and distance data and an ending time cannot be recorded into the memory card any more. Further, where each of a starting time and an ending time requires, for example, 6 bytes for year, month, day, hour, minute and second, each updating of the ID record area involves reduction by of a remaining portion of the movement data record area by 12 bytes. Accordingly, the memory card must be exchanged for a new memory card after a short interval of time, which is uneconomical.

SUMMARY OF THE INVENTION

It is an object of the present invention to provide a digital movement data recording apparatus which controls reduction of an available area of a record medium, particularly of an ID record area of a record medium, to increase the period of time over which movement data can be recorded.

In order to attain the object, there is provided a digital movement recording apparatus for recording a moving condition of a vehicle into a record medium which is removably inserted into the digital movement recording apparatus and has a first record area and a second record area, which comprises movement starting detecting means for detecting starting of a movement of the vehicle, movement ending detecting means for detecting ending of a movement of the vehicle, writing means for recording, in response to starting of a movement of the vehicle, time data representative of the time of such starting into the first record area of the record medium and then recording movement data representative of a moving condition of the vehicle successively into the first record area of the record medium subsequent to the recorded portion of the starting time and for stopping, in response to ending of the movement of the vehicle, recording of movement data and then recording time data representative of the time of such ending into the first record area of the record medium subsequent to the recorded portion of the movement data and further recording, into the second record area of the record medium, address data representative of an address of the portion of the first record area at which the ending time data are recorded, time counting means for starting counting of a time in response to ending of a movement of the vehicle, judging means for judging, in response to starting of a movement of the vehicle, whether or not the time counted by the time counting means remains within a predetermined range, and erasing means for erasing, when the counted time by the time counting means remains within the predetermined range, last time data representative of an ending time of a movement of the vehicle and the address data representative of the address of the first record area of the record medium at which the last time data are recorded, from the first and second record areas of the record medium, respectively.

With the digital movement recording apparatus, even if starting of a movement of the vehicle is detected and time data and address data are recorded into the record medium in response to such starting, if the movement does not continue further than the predetermined range, then the thus recorded time data and address data are erased from the record medium. Accordingly, even if ending of a movement is detected by a large number of times in a short period of time, data regarding such movements are not maintained in the record medium, and consequently, an available area of the record medium remaining for further recording is not consumed in a short period of time. Accordingly, movement data can be recorded into a record medium over a long period of time and replacement of such record medium need not be performed in a short period of time, which is economical.

The above and other objects, features and advantages of the present invention will become apparent from the following description and the appended claims, taken in conjunction with the accompanying drawings in which like parts of elements are denoted by like reference characters.

DESCRIPTION OF THE PREFERRED EMBODIMENT

Figure 1:
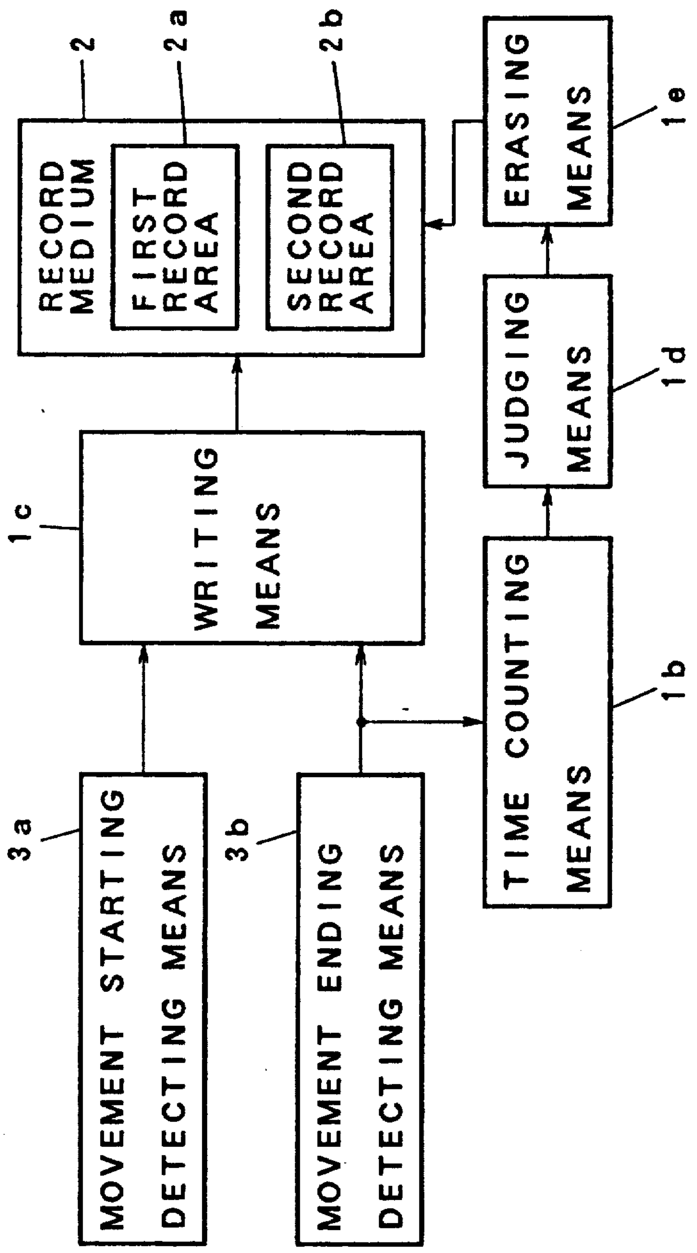
FIG. 1 is a block diagram showing basic construction of a digital movement recording apparatus according to the present invention.

Referring first to FIG. 1, there is shown basic construction of a digital movement recording apparatus according to the present invention. The digital movement recording apparatus is incorporated in a vehicle not shown and includes a record medium 2 adapted to be removably inserted into a recording section not shown of the digital movement recording apparatus and having a first record area 2*a* for recording therein movement data representative of particulars of movements of the vehicle together with time data representative of starting and ending times of the individual movements and a second record area 2*b* for recording therein address data representative of addresses of the first record area 2*a* at which the ending time data are individually recorded. The digital movement recording apparatus further includes movement starting detecting means 3*a* for detecting starting of a movement of the vehicle, movement ending detecting means 3*b* for detecting ending of a movement of the vehicle, and writing means 1*c* responsive to ending of a movement of the vehicle detected by the movement ending detecting means 3*b* for recording time data representative of a time of such ending subsequent to the movement data representative of particulars of preceding movements recorded in the first record area 2*a* and further recording into the second record area 2*b* address data representative of an address of the first record area 2*a* at which the ending time data are recorded. The digital movement recording apparatus further includes time counting means 1*b* for starting counting of a time in response to detection of ending of a movement of the vehicle by the movement ending detecting means 3*b*, judging means 1*d* for judging, in response to detection of starting of a movement by the movement starting detecting means 3*a*, whether or not the time counted by the time counting means 1*b* remains within a predetermined range, and erasing means 1*e* for erasing, when it is judged by the judging means 1*d* that the counted time remains within the predetermined range, last time data representative of the ending time and last address data representative of an address of the first record area 2*a* at which the time data are recorded, which time data and address data have been written into the first record area and the second record area 2*b*, respectively, of the record medium 2 by the writing means 1*c* in response to last detection of ending of a movement of the vehicle.

The movement starting detecting means 3*a* detects switching on of an ignition switch or an accessory switch not shown of the vehicle to detect starting of a movement of the vehicle, and the movement ending detecting means 3*b* detects switching off of the ignition switch or the accessory switch to detect ending of such movement.

Or alternatively, the movement starting detecting means 3*a* may detect insertion of the record medium 2 into the recording section to detect starting of a movement of the vehicle, and the movement ending detecting means 3*b* may detect removal of the record medium 2 from the recording section to detect ending of the movement of the vehicle.

With the digital movement recording apparatus of the construction described above, if the movement starting detecting means 3*a* either detects switching on of the ignition switch or the accessory switch of the vehicle or detects insertion of the record medium 2 into the recording section to detect starting of a movement of the vehicle, then the writing means 1*c* first records time data representative of a starting time of the movement of the vehicle into the first record area 2*a* of the record medium 2, and after then, it records subsequent movement data of the vehicle into the first record area 2*a*. On the other hand, if the movement ending detecting means 3*b* either detects switching off of the ignition switch or the accessory switch of the vehicle or detects removal of the record medium 2 from the recording section to detect ending of the movement of the vehicle, then the writing means 1*c* records time data representative of an ending time of the movement of the vehicle into the first record area 2*a* of the record medium 2 and then records, into the second record area 2*b* of the record medium 2, address data representative of an address of the first record area 2*a* at which the time data are recorded.

In the meantime, when the movement ending detecting means 3*b* detects ending of the movement of the vehicle, the time counting means 1*b* starts counting of time. After then, when the movement starting detecting means 3*a* detects a movement of the vehicle, the judging means 1*d* judges whether or not the counted time of the time counting means remains within the predetermined range. Then, if it is judged by the judging means 1*d* that the counted time remains within the predetermined range, then last time data and address data, that is, the time data representative of the ending time which has been written into the first record area 2*a* of the record medium 2 by the writing means 1*c* in response to last detection of ending of the movement of the vehicle and the address data representative of the address of the first record area 2*a* at which the time data have been recorded, are erased by the erasing means 1*e*.

Accordingly, even if starting of a movement of the vehicle is detected and time data and address data are recorded into the record medium 2 in response to such starting, if the movement does not continue further than the predetermined range, then the thus recorded time data and address data are erased from the record medium 2. Accordingly, even if ending of a movement is detected by a large number of times in a short period of time, data regarding such movements are not maintained in the record medium 2, and consequently, an available area of the record medium 2 remaining for further recording is not consumed in a short period of time.

Figure 2:
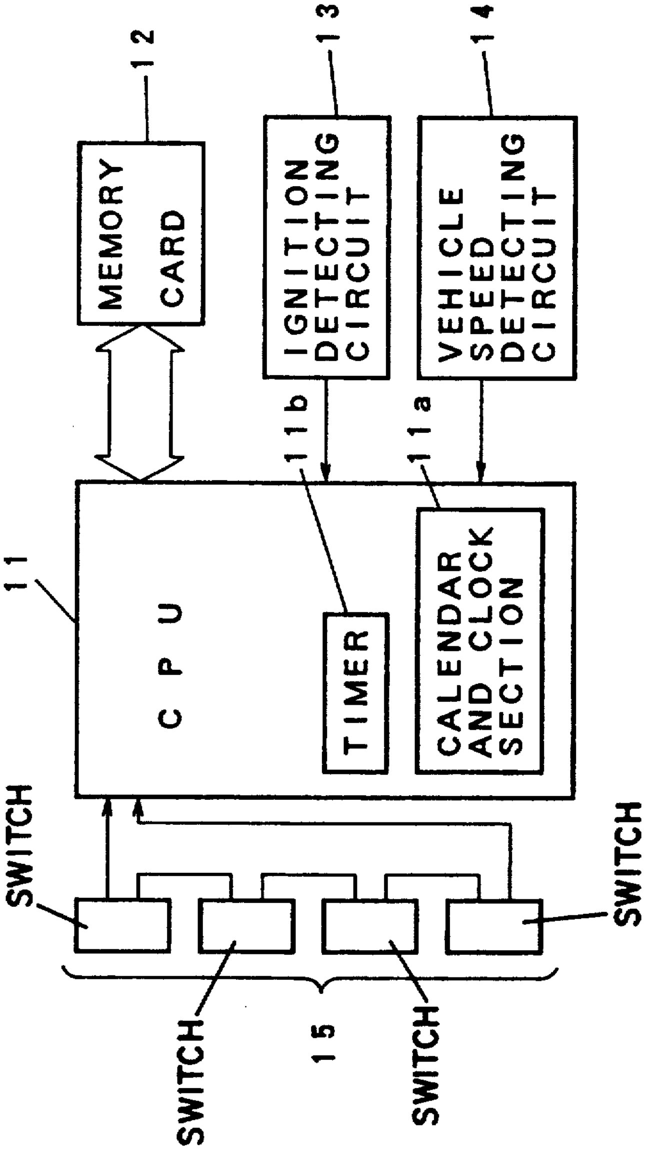
FIG. 2 is a block diagram of a digital movement recording apparatus showing a preferred embodiment of the present invention.

Referring now to FIG. 2, there is shown in block diagram a digital movement recording apparatus according to a preferred embodiment of the present invention. The digital movement recording apparatus shown is incorporated in a vehicle not shown and includes a CPU (central processing unit) 11 having a calendar and clock section 11*a* for producing time data indicative of a current year, month, day, hour, minute and second and a timer 11*b*, a memory card 12 adapted to be removably inserted into a recording section (not shown) of the digital movement recording apparatus and serving as a record medium, an ignition detecting circuit 13 serving both as movement starting detecting means and movement ending detecting means for detecting switching on and off of an ignition switch (not shown) of the vehicle, a vehicle speed detecting circuit 14 for detecting a driving speed of the vehicle, and an 8-bit dip switch 15 for setting a serial number of the vehicle. The memory card 12 serves as such record medium 2 as seen in FIG. 1 and has, as illustratively shown in FIG. 7, a first record area 2*a* for recording movement data of the vehicle therein and a second record area 2*b* for recording address data therein. When the memory card 12 is inserted into the recording section for the first time, the CPU 11 records the serial number of the vehicle set by the dip switch 15 into the memory card 12.

It is to be noted that the ignition detecting circuit 13 may be replaced by an accessory detecting switch for detecting switching on and off of an accessory switch (not shown) of the vehicle.

Figure 3:
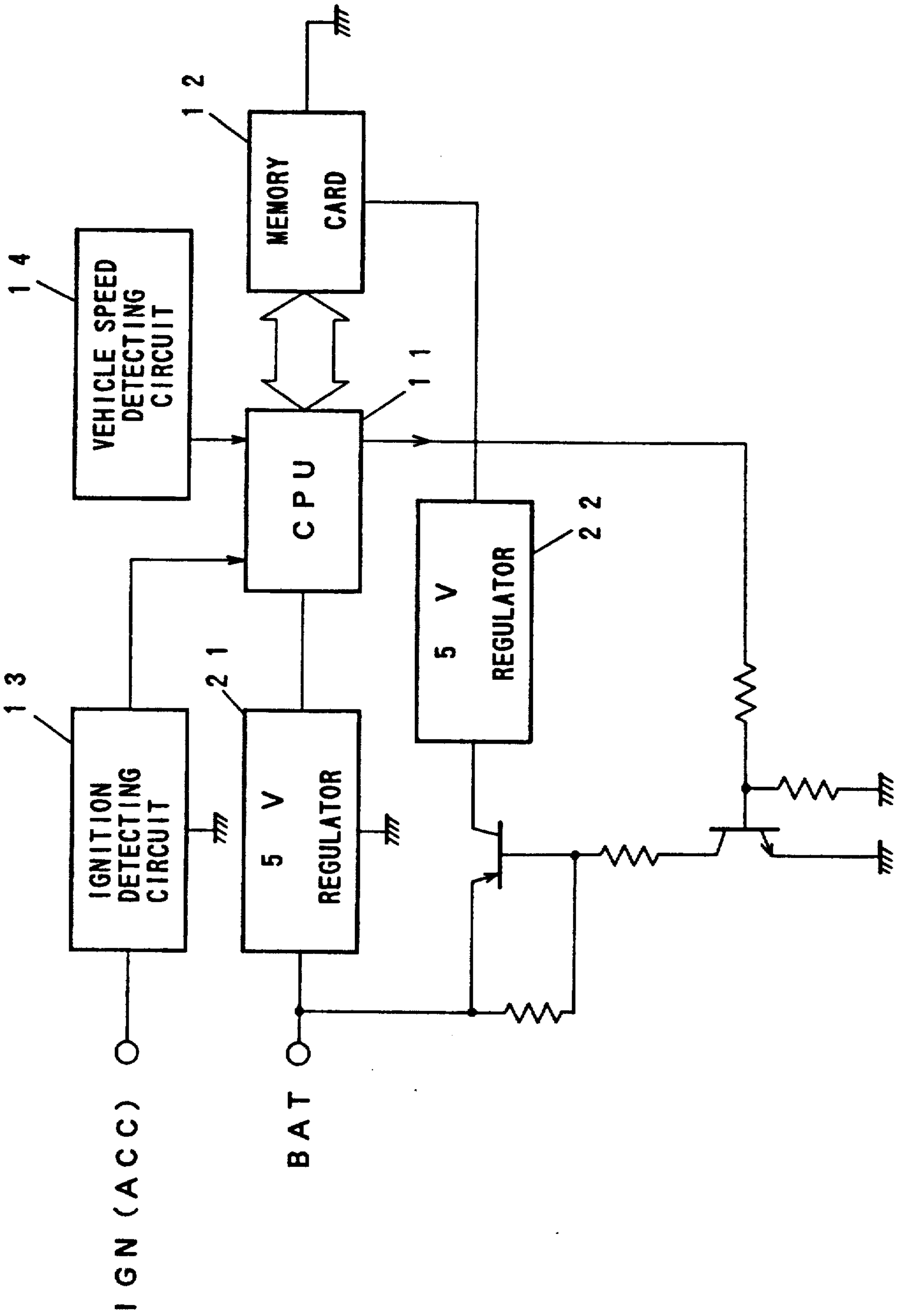
FIG. 3 is a block diagram showing more detailed construction of the digital movement recording apparatus of FIG. 2.

FIG. 3 illustrates connection of the ignition switch IGN or accessory switch ACC, a battery BAT, the CPU 11, the memory card 12 and so forth. Referring to FIG. 3, power is supplied from the ignition switch IGN to the CPU 11 by way of the ignition detecting circuit 13 while power is also supplied to the CPU 11 from the battery BAT by way of a 5 volt regulator 21. Meanwhile, power is supplied to the memory card 12 from the battery BAT by way of a transistor $Q_1$ and another 5 volt regulator 22. Another transistor $Q_2$ is connected to the base of the transistor $Q_1$, and the base of the transistor $Q_2$ is connected to the CPU 11.

When the ignition switch IGN is switched on, the CPU 11 outputs a signal b, and in response to the signal b, the transistor $Q_2$ is turned on, whereupon the transistor $Q_1$ is turned on. When the transistor $Q_1$ is on, power is supplied from the battery BAT to the memory card 12. On the contrary when the ignition switch IGN is switched off, the CPU 11 detects such signal a from the ignition detecting circuit 13, and writes time data representative of an ending time into the memory card 12 and further writes into the memory card 12 address data representative of an address of the memory card 12 at which the time data have been written. After then, the CPU 11 turns the transistor $Q_2$ off to turn the transistor $Q_1$ off to interrupt supply of power from the battery BAT to the memory card 12.

Operation of the digital movement recording apparatus having such construction as described above will be described in detail with reference to flow charts shown in FIGS. 4*a* and 4*b*.

Figure 4A:
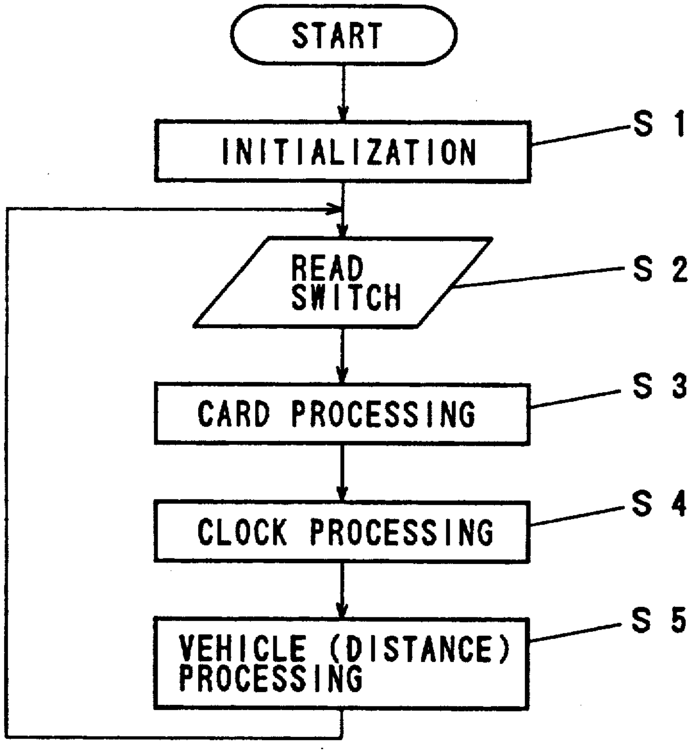
FIGS. 4*a* and 4*b* are flow charts illustrating operation of the digital movement recording apparatus of FIG. 2.

After, for example, power is made available, the CPU 11 of the digital movement recording apparatus starts its operation in accordance with a main routine shown in FIG. 4*a*. Referring to FIG. 4*a*, the CPU 11 executes, first at step S1, its initializing operation to set an $ID_{ok}$ flag and a measurement flag both to 0. Then at step S2, the CPU 11 reads a serial number of the vehicle set by way of the dip switch 5 and writes the thus read serial number into a predetermined record area of the memory card 12. Subsequently at step S3, a card processing subroutine illustrated in FIG. 4*b* is executed, and after then, at step S4, the CPU 11 executes a time processing subroutine in which time data which are produced by the calendar and clock section 11*a* in the CPU 11 and so forth are read in. Finally, the CPU 11 executes, at step S5, a vehicle speed (distance) processing subroutine in which vehicle speed data (or/and distance data) are produced making use of a signal from the vehicle speed detecting circuit 14. After then, the control sequence returns to step S2.

Figure 4B:
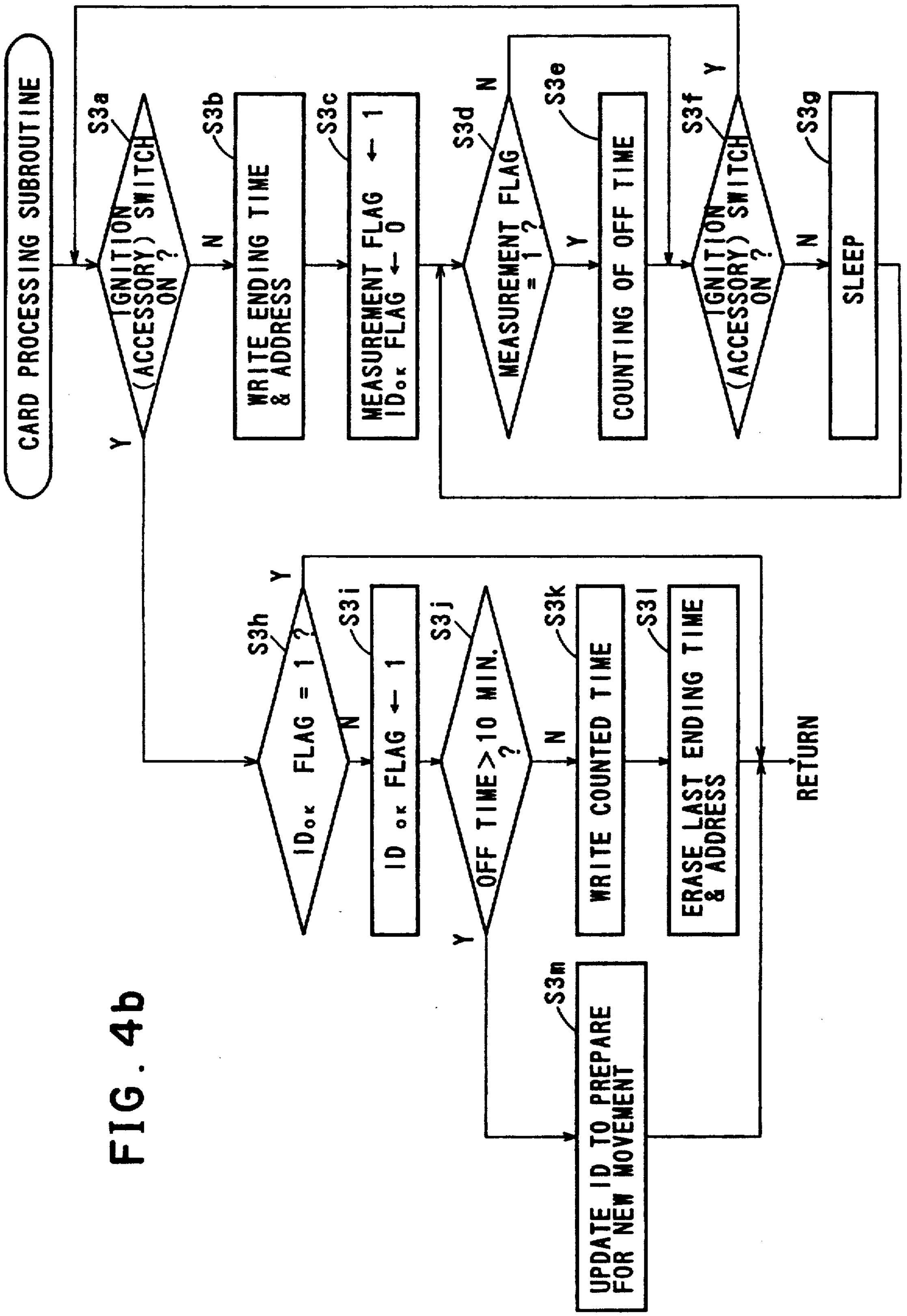
Figure 7:
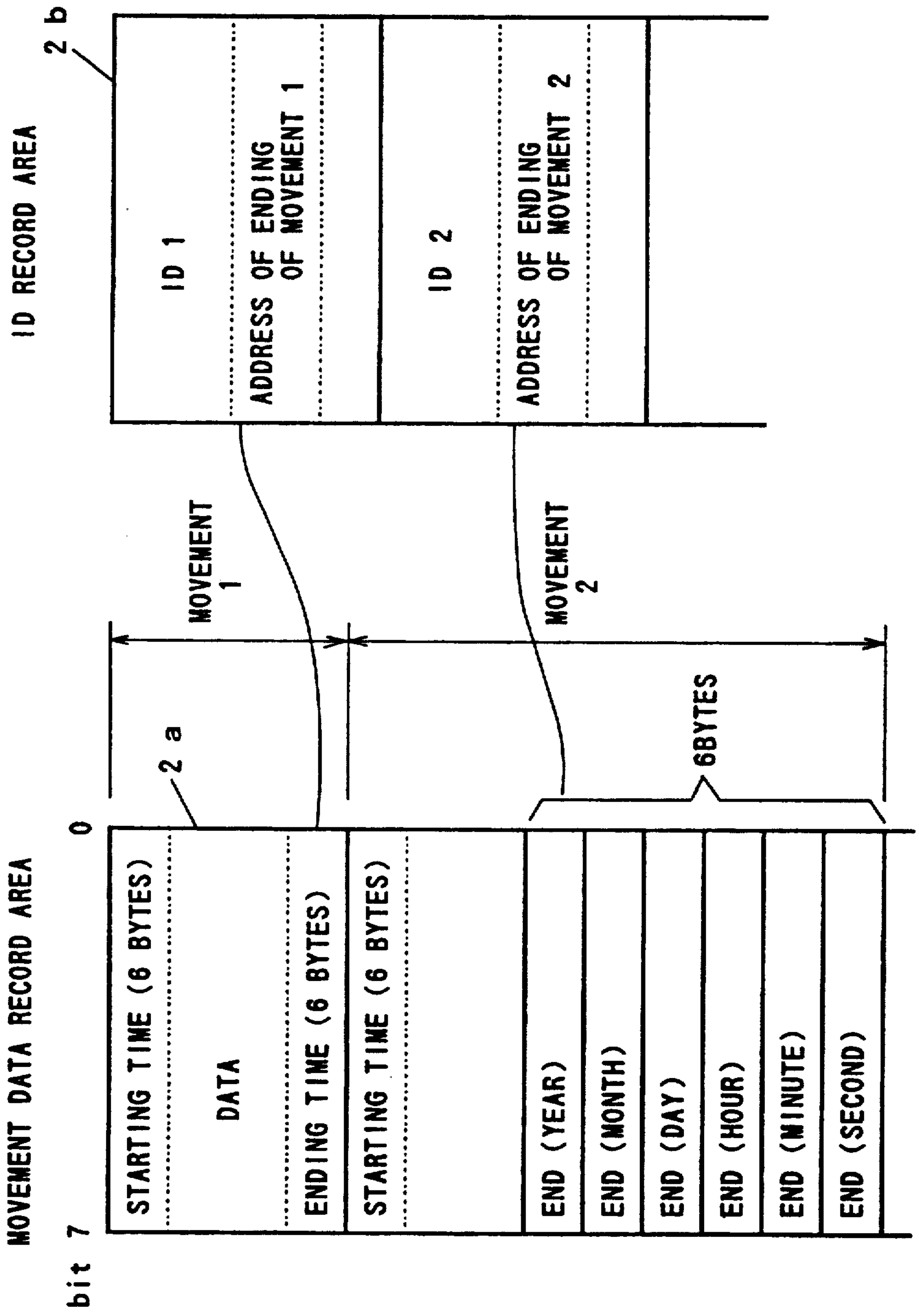
FIG. 7 is a diagrammatic representation illustrating a record format of a memory card.

Referring now to FIG. 4*b*, at first step S3*a* after the card processing subroutine shown is entered, the CPU 11 checks a signal from the ignition detecting circuit 14 to judge whether or not the ignition or accessory switch IGN or ACC is on. If the ignition or accessory switch IGN or ACC is off and the judgment at step S3*a* is NO, then the CPU 11 writes, at step S3*b*, an ending time into the movement data record area 2*a* of the memory card 12 and then writes, into the ID record area 2*b* of the memory card 12, an address of the movement data record area 2*a* at which the ending time is thus written, as seen in FIG. 7. Subsequently at step S3*c*, the measurement flag and the $ID_{OK}$ flag mentioned hereinabove are set to 1 and 0, respectively. Then at step S3*d*, it is judged whether or not the measurement flag is equal to 1, and if the judgment is YES, then counting of on time of the ignition or accessory switch IGN or ACC is started at step S3*e*. After then, the control sequence advances to step S3*f* at which it is judged whether or not the ignition or accessory switch IGN or ACC is on, and then if the judgment is on, then the CPU 11 puts itself into a sleep (hold) mode at step S3*g*. In such sleep mode, the CPU 11 stops is operation, but an internal interrupt timer (not shown) thereof still continues its operation so that the control sequence of the CPU 11 intermittently advances to step S3*d* in order to execute the jobs at step S3*d* and at following steps of the subroutine. Consequently, the off time of the ignition or accessory switch IGN or ACC can be measured at step S3*e*. It is to be noted that no power is supplied to the memory card 12 while the ignition or accessory switch IGN or ACC remains off as described hereinabove.

Then, if the ignition or accessory switch IGN or ACC is switched on, then this is judged at step S3*f* in such interrupt operation. Consequently, the control sequence now advances from step S3*f* to step S3*a* at which it is also judged that the ignition or accessory switch IGN or ACC is off, and the control sequence now advances to step S3*h*. At step S3*h*, it is judged whether or not the $ID_{OK}$ flag is equal to 1. If the judgment is NO, then the $ID_{OK}$ flag is set to 1 at step S3*i*, and then it is judged at step S3*j* whether or not the off time of the ignition or accessory switch counted at step S3*f* is longer than 10 minutes. If the judgment is NO, the control sequence advances to step S3*k* at which the counted time for which the ignition or accessory switch IGN or ACC has continued to be in an off state is written into the memory card 12. Then at step S3*l*, last time data representative of the ending time and last address data representative of the address of the movement data record area 2*a* of the memory card 12 at which the time data are written, which have both been written into the movement data record area 2*a* and the ID record area 2*b* of the memory card 12 at step S3*b* described hereinabove, are erased. After then, the control sequence returns to the main routine shown in FIG. 4*a*.

On the contrary, if it is judged at step S3*j* that the off time is longer than 10 minutes, then the control sequence advances to step S3*m* at which the ID record area 2*b* of the memory card 12 is updated to prepare for a new movement of the vehicle, that is, a starting time of a new movement of the vehicle is written into the memory card 12, whereafter the control sequence returns to the main routine shown in FIG. 4*a*. On the other hand, also when it is judged at step S3*h* that the $ID_{OK}$ flag is equal to 1, the control sequence returns to the main routine of FIG. 4*a*.

Figure 5:
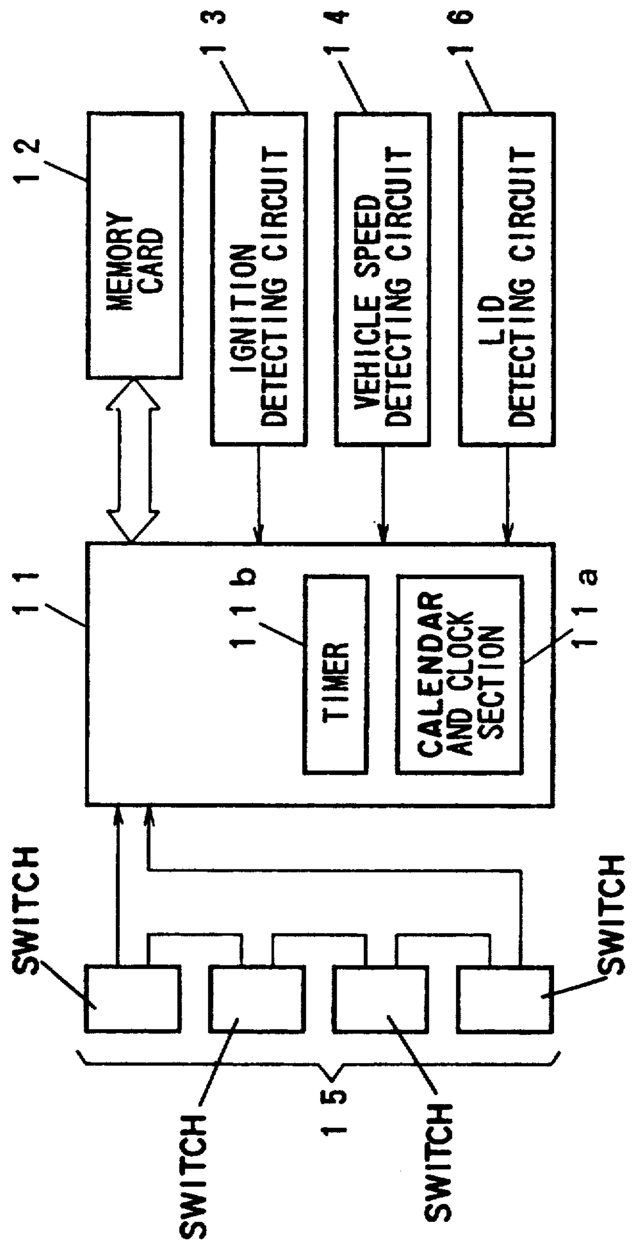
FIG. 5 is a block diagram of another digital movement recording apparatus showing a modification to the embodiment shown in FIG. 1.

Referring now to FIG. 5, there is shown in block diagram a modification to the digital movement recording apparatus of the embodiment described above. The modified digital movement recording apparatus additionally includes, as means for detecting starting and ending of a movement of the vehicle, a lid detecting circuit 16 for detecting insertion or removal of the memory card 12 into or from the recording section depending upon a condition of a lid switch which is switched on and off in response to opening and closing of a lid (not shown) for the recording section. Thus, when the lid detecting switch 16 detects opening of the lid, the CPU 11 determines that the memory card 12 has been removed from the recording section, but when the lid detecting switch 16 detects closing of the lid, the CPU 11 determines that the memory card 12 is inserted in the recording section.

Figure 6:
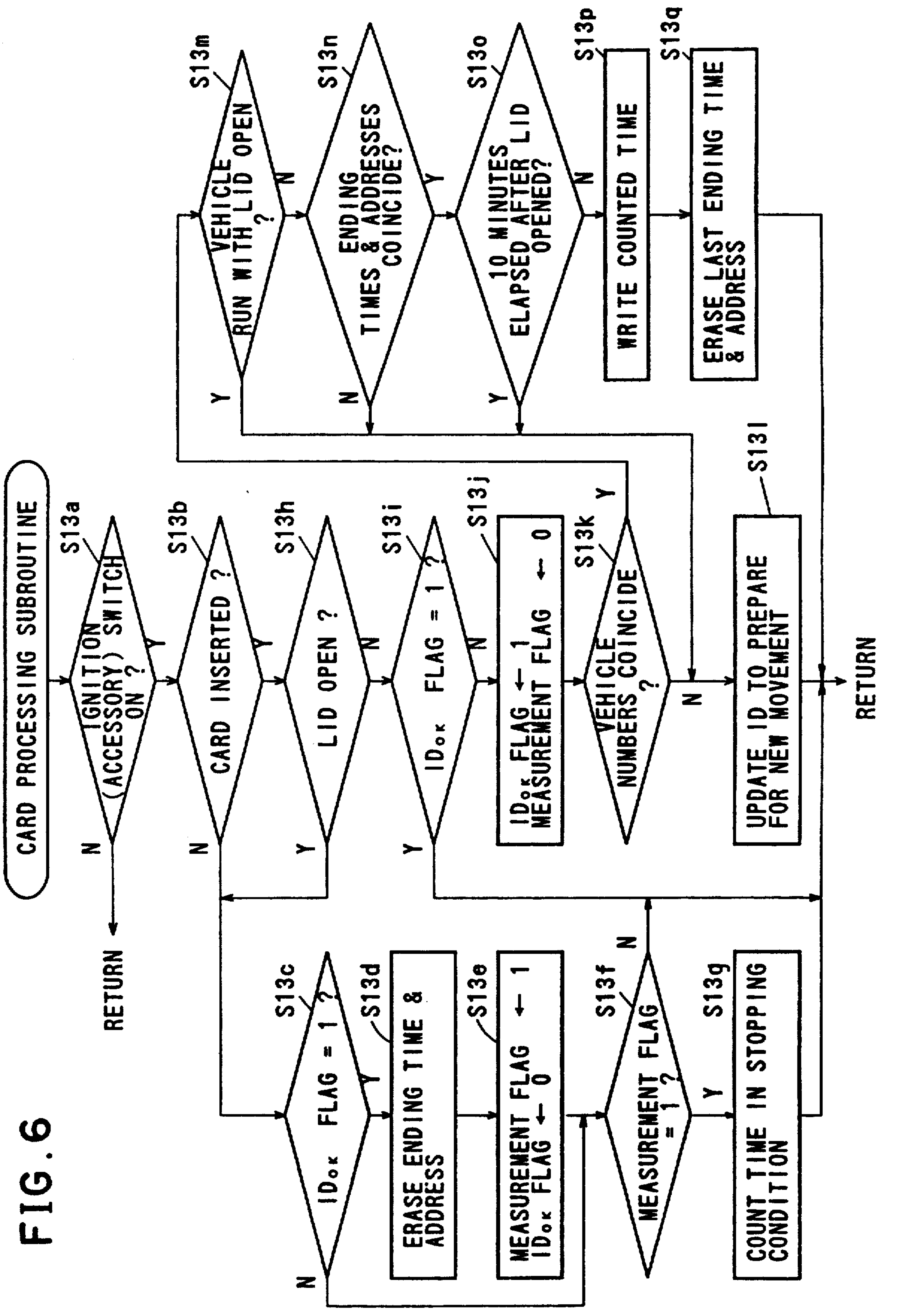
FIG. 6 is a flow chart illustrating operation of the digital movement recording apparatus of FIG. 5.

Operation of the modified digital movement recording apparatus will be described in detail below with reference to FIG. 6 which shows details of a card processing subroutine at step S3 of the main routine of FIG. 4*a* and corresponds to the subroutine shown in FIG. 4*b*. After the modified card processing subroutine is entered, the CPU 11 first checks a signal from the ignition detecting circuit 13 at step S13*a* to judge whether or not the ignition or accessory switch IGN or ACC is on, and if the judgment is NO, then the control sequence returns to the main routine shown in FIG. 4*a*. But on the contrary if the judgment at step S13*a* is YES, then the control sequence advances to step S13*b* at which it is detected depending upon a signal from the recording section whether or not the memory card 12 is inserted in position in the recording section. To this end, a card detecting switch not shown which is, for example, turned on by insertion of the memory card 12 into the recording section is provided in the recording section. If the judgment at step S13*b* is NO (which means that the memory card 12 has been removed from the recording section), then the control sequence advances to step S13*c* at which it is judged whether or not the $ID_{OK}$ flag is equal to 1. If the judgment here is YES, then such ending time data and ending address data as described hereinabove are written, at step S13*d*, into the movement data record area 2*a* and the ID record area 2*b*, respectively, of the memory card 12 as seen in FIG. 7, whereafter the measurement flag and the $ID_{OK}$ flag are set to 1 and 0, respectively, at step S13*e*. Then at step S13*f*, it is judged whether or not the measurement flag is equal to 1, and if the judgment here is YES, then the control sequence advances to step S13*g* at which a time within which it is continuously detected depending upon a signal from the vehicle speed detecting circuit 14 that the speed of the vehicle is 0 km/h, which signifies that the vehicle is in a stopping condition, is counted by the timer function of the CPU 11. After then, the control sequence returns to the main routine shown in FIG. 4*a*. On the other hand, in case it is judged at step S13*c* that the $ID_{OK}$ flag is not equal to 1, the control sequence directly advances to step S13*f*. Then, if it is judged at step S13*f* that the measurement flag is not equal to 1, then the control sequence returns to the main routine shown in FIG. 4*a*.

On the other hand, in case the memory card 12 is inserted in the recording section and consequently the judgment at step S13*b* is YES, the control sequence advances to step S13*h* at which it is detected depending upon a signal from the lid detecting circuit 16 whether or not the lid is in an open condition. If the lid is open and consequently the judgment is YES, the control sequence advances to step S13*c*, but on the contrary if the lid is closed and consequently the judgment at step S13*h* is NO, then the controls sequence advances to step S13*i* at which it is detected whether or not the $ID_{OK}$ flag is equal to 1. If the judgment at step S13*i* is YES, that is, the $ID_{OK}$ flag is equal to 1, the control sequence returns to the main routine shown in FIG. 4*a*. But on the contrary if the judgment at step S13*i* is NO, that is, the $ID_{OK}$ flag is equal to 0, then the control sequence advances to step S13*j* at which the $ID_{OK}$ flag is set to 1 and the measurement flag is set to 0. Subsequently at step S13*k*, it is detected whether or not the serial number of the vehicle recorded in the memory card 12 coincides with the serial number of the vehicle set by way of the dip switch 5. Then, if the serial numbers do not coincide with each other and consequently the judgment at step S13*k* is NO, then it is determined that the memory card 12 is not the one specified for the present digital movement recording apparatus, and the control sequence thus advances to step S13*l* at which the ID record area 2*a* of the memory card 12 shown in FIG. 7 is updated to prepare for starting of a new movement of the vehicle, that is, a starting time of a new movement of the vehicle is written into the memory card 12. After then, the control sequence returns to the main routine shown in FIG. 4.

On the contrary, if the serial numbers coincide with each other and the judgment at step S13*k* is YES, the control sequence advances to step S13*m* at which it is detected by the vehicle speed detecting circuit 14 whether or not the vehicle is moving while it is detected by the lid detecting circuit 16 that the lid for the recording section remains in an open state, that is, whether or not the vehicle drives with the lid left open, and if the judgment is YES, then the control sequence advances to step S13*l*, but on the contrary if the judgment is NO, then the control sequence advances to step S13*n*. At step S13*n*, it is judged whether or not last ending time and ending address data written in the memory card 12 coincide with the ending time and ending address data which were recorded into an internal memory area not shown of the CPU 11 when the memory card 12 was removed from the recording section. If the ending times and the ending address data do not coincide with each other and the judgment at step S13*n* is NO, it is determined that the memory card 12 currently inserted in the recording section is not the one specified for the present digital movement recording apparatus, and the control sequence thus advances to step S13*l*. But on the contrary if the ending times and the ending address data coincide with each other and the judgment at step S13*n* is YES, it is judged subsequently at step S13*o* whether or not the condition wherein the lid remains in an open state in a stopping condition of the vehicle has continued for 10 minutes. If the judgment is YES, the control sequence advances to step S13*l*, but on the contrary if the judgment is NO, the control sequence advances to step S13*p* at which the time counted at step S13*g* until the memory card 12 is inserted again after removal thereof is written into the movement data record area 2*a* of the memory card 12. Then at step S13*q*, last ending time and ending address data recorded in the movement data record area 2*a* and ID record area 2*b* of the memory card 12 are erased, whereafter the control sequence returns to the main routine shown in FIG. 4*a*.

It is to be noted that, while it is described hereinabove that starting and ending of a movement of the vehicle are detected depending upon switching on and off of the ignition or accessory switch or depending upon opening and closing of the lid for the recording section in the embodiment of the present invention or the modification to the embodiment, the present invention can be applied to a different digital movement recording apparatus wherein starting and ending of a movement are detected by any other means.

Having now fully described the invention, it will be apparent to one of ordinary skill in the art that many changes and modifications can be made thereto without departing from the spirit and scope of the invention as set forth herein.

What is claimed is:

1. A digital movement recording apparatus for recording a moving condition of a vehicle onto a record medium having a first record area and a second record area which is removably inserted therein, said moving condition being recorded for each of a plurality of independent movements, each of said independent movements being identified by a starting time and an ending time thereof, said digital movement recording apparatus comprising:

movement starting detecting means for detecting starting of a movement of said vehicle;

movement ending detecting means for detecting ending of a movement of said vehicle;

time counting means for starting counting of a time in response to ending of a movement of said vehicle;

determining means for determining, in response to starting of a movement of said vehicle, whether a movement is a part of a preceding independent movement;

writing means for recording time data in response to a starting of a movement of said vehicle, said time data being representative of a time of said starting, and being recorded into said first record area of said record medium thereby forming a first recorded portion, said writing means then recording movement data representative of a moving condition of said vehicle successively into said first record area of said record medium, thereby forming a second recorded portion subsequent to the first recorded portion, said writing means also stopping, in response to ending of the movement of said vehicle, recording of movement data and then recording time data representative of a time of said ending of said movement into said first record area of said record medium, subsequent to the second recorded portion, and said writing means further recording address data representative of an address of a portion of said first record area at which the ending time data is recorded, into said second record area, and said writing means recording the counted time by said time counting means into said first record area of said record medium, subsequent to the second recorded portion of said movement data representative of a moving condition of said vehicle if said determining means determines that a movement is a part of a preceding independent movement; and erasing means for erasing last time data representative of an ending time of a movement of said vehicle, and the address data representative of the address of said first record area of said record medium at which the last time data are recorded, from said first and second record areas of said record medium, respectively, when said determining means determines that a movement is a part of a preceding independent movement.

2. A digital movement recording apparatus according to claim 1, wherein said movement starting detecting means detects starting of a movement of said vehicle by an off-to-on operation of an ignition switch of said vehicle, and said movement ending detecting means detects ending of a movement of said vehicle by an on-to-off operation of said ignition switch.

3. A digital movement recording apparatus according to claim 1, wherein said movement starting detecting means detects starting of a movement of said vehicle by an off-to-on operation of an accessory switch of said vehicle, and said movement ending detecting means detects ending of a movement of said vehicle by an on-to-off operation of said accessory switch.

4. A digital movement recording apparatus according to claim 1, wherein said movement starting detecting means detects starting of a movement of said vehicle when said record medium has been inserted in place in said apparatus, and said movement ending detecting means detects ending of a movement when said record medium is removed from said apparatus.

5. A digital movement recording apparatus according to claim 1, wherein said apparatus further includes an interrupt timer for intermittently causing said movement starting detecting means to detect starting of a movement of said vehicle after said writing means has recorded address data representative of an address of a portion of said first record area at which the ending time data are recorded, into said record area.

6. A digital movement recording apparatus according to claim 1, wherein said determining means further determines, in response to starting of a movement of said vehicle, that a movement is a part of a preceding independent movement if said record medium is consecutively used in the apparatus.

7. A digital movement recording apparatus according to claim 6, wherein said record medium is recorded thereon an identification of a vehicle when said record medium is inserted into the apparatus, and said determining means determines that a record medium is consecutively used in the apparatus, if an identification of a vehicle is identical with an identification last recorded on said record medium.

8. A digital movement recording apparatus according to claim 6, wherein said apparatus stores an ending time of a preceding movement therein, and said determining means determines that a record medium is consecutively used in the apparatus, if the ending time of the preceding independent movement stored in the apparatus is identical with an ending time of an independent movement last recorded on said record medium.

9. A digital movement recording apparatus according to any one of claims 1-8, wherein said determining means determines, in response to starting of a movement of said vehicle, that a movement is a part of a preceding independent movement, if a time counted by said time counting means remains within a predetermined range.

10. A digital movement recording apparatus according to any one of claims 1-8, wherein said record medium is a magnetically recorded card.

* * * * *